United States Patent [19]

Cairns et al.

[11] Patent Number: 4,587,001

[45] Date of Patent: May 6, 1986

[54] CATHODE FOR USE IN ELECTROLYTIC CELL

[75] Inventors: John F. Cairns; David A. Denton, both of Cheshire, England; Patrick A. Izzard, North Wales, Wales

[73] Assignee: Imperial Chemical Industries PLC, London, England

[21] Appl. No.: 619,208

[22] Filed: Jun. 11, 1984

[30] Foreign Application Priority Data

Jun. 21, 1983 [GB] United Kingdom ............... 8316778

[51] Int. Cl.⁴ ............................................. C25B 11/08
[52] U.S. Cl. ........................... 204/290 R; 204/290 F; 502/101
[58] Field of Search ................ 204/290 R, 290 F; 502/101

[56] References Cited

U.S. PATENT DOCUMENTS

| | | | |
|---|---|---|---|
| 3,974,058 | 8/1976 | Gokhale | 204/266 |
| 4,100,049 | 7/1978 | Brannan | 204/242 |
| 4,313,814 | 2/1982 | Saito | 204/290 R |
| 4,331,528 | 5/1982 | Beer et al. | 204/290 F |
| 4,465,580 | 8/1984 | Kasuya | 204/290 R |

FOREIGN PATENT DOCUMENTS

| | | |
|---|---|---|
| 1796325 | 2/1973 | Fed. Rep. of Germany . |
| 1667107 | 4/1978 | Fed. Rep. of Germany . |
| 54090080 | 12/1977 | Japan . |
| 54-110983 | 8/1979 | Japan . |
| 57-13189 | 1/1982 | Japan . |
| 1071070 | 6/1967 | United Kingdom . |
| 1135514 | 12/1968 | United Kingdom . |

OTHER PUBLICATIONS

Patent Abstracts of Japan, Unexamined Applications, Field C, vol. 6, No. 78, May 15, 1982, p. 57 C 102.

*Primary Examiner*—John F. Niebling
*Attorney, Agent, or Firm*—Cushman, Darby & Cushman

[57] ABSTRACT

A cathode for use in an electrolytic cell which comprises a metallic substrate, preferably of nickel alloy, and a coating thereon of a mixture of at least one platinum group metal and at least one platinum group metal oxide, the coating comprising from 2% to 30% by weight of platinum group metal. In the electrolysis of water or an aqueous solution e.g. an alkali metal chloride solution, the cathode has a low hydrogen overvoltage.

7 Claims, No Drawings

CATHODE FOR USE IN ELECTROLYTIC CELL

This invention relates to a cathode for use in an electrolytic cell, and in particular to a cathode which has a low hydrogen over-voltage when used in the electrolysis of water or aqueous solutions, e.g. aqueous alkali metal chloride solutions.

The voltage at which a solution is electrolysed is made up of the sum of a number of elements, namely the theoretical electrolysing voltage, the over-voltages at the anode and cathodes, the resistance of the solution which is electrolysed, the resistance of the diaphragm or membrane, if any, positioned between the anode and cathode, and the resistance of the metallic conductors and their contact resistances.

As the cost of electrolysis is proportional to the voltage at which electrolysis is effected, and in view of the high cost of electrical power, it is desirable to reduce the voltage at which a solution is electrolysed to as low as a value as possible. In the electrolysis of water or aqueous solutions there is considerable scope for achieving such a reduction in electrolysing voltage by reducing the hydrogen over-voltage at the cathode.

There have been many prior proposals of means of achieving such a reduction in hydrogen over-voltage. For example, it is known that the hydrogen over-voltage at a cathode may be reduced by increasing the surface area of the cathode, e.g. by etching the surface of the cathode in an acid, or by grit-blasting the surface of the cathode, or by coating the surface of the cathode with a mixture of metals and selectively leaching one of the metals from the coating.

Other methods of achieving a low hydrogen over-voltage cathode which have been described involve coating the surface of a cathode with an electro-catalytically-active material. Examples of such prior disclosures include the following.

U.S. Pat. No. 4,100,049 discloses a cathode comprising a substrate of iron, nickel, cobalt or alloys thereof and a coating of a mixture of a precious metal oxide, particularly palladium oxide, and a valve metal oxide particularly zirconium oxide.

British Pat. No. 1511719 discloses a cathode comprising a metal substrate, which may be ferrous metal, copper or nickel, a coating of cobalt, and a further coating consisting of ruthenium.

Japanese Patent Publication No. 54090080 discloses pre-treating an iron cathode with perchloric acid followed by sinter coating the cathode with cathode active substances, which may be ruthenium, iridium, iron or nickel in the form of the metal or a compound of the metal.

Japanese Patent Publication No. 54110983 discloses a cathode, which may be of mild steel, nickel or nickel alloy and a coating of a dispersion of nickel or nickel alloy particles and a cathode activator which comprises one or more of platinum, ruthenium, iridium, rhodium, palladium or osmium metal or oxide.

Japanese Patent Publication No. 53010036 discloses a cathode having a base of a valve metal and a coating of an alloy of at least one platinum group metal and a valve metal, and optionally a top coating of at least one platinum group metal.

Many of the aforementioned cathodes, particularly those coated with a coating of an electro-catalytically-active material, suffer from the disadvantage that, although the initial hydrogen over-voltage at the cathode may be low, the hydrogen over-voltage tends to increase with time of use and the low hydrogen over-voltage performance may be short-lived.

Japanese Patent Publication No. 5713189 discloses a cathode of nickel or a nickel alloy substrate to which a coating of platinum group metal or oxide thereof is applied. The cathode is said to have a low hydrogen over-voltage when used in the electrolysis of water or an aqueous alkali metal halide solution. The platinum group metals may be used singly or in combination, and the metals may be applied to the substrate in the form of a solution of a platinum group metal compound followed by thermal decomposition of the compound, or by electro-deposition. Suitable solvents for the platinum group metal compounds include, water, ethyl alcohol, methyl alcohol, propyl alcohol, butyl alcohol, benzene, toluene, ethyl ether, lavender oil, linalool oil, aniseed oil, and terebine oil. The patent publication refers to the coating consisting of a platinum group metal or oxide thereof, and it does not suggest that the coating on the nickel or nickel alloy substrate of the cathode may comprise a platinum group metal in admixture with a platinum group metal oxide, although in the examples of the publication there are disclosed cathodes of a nickel alloy substrate and coatings of platinum metal, platinum metal and rhodium oxide, platinum metal and iridium oxide, and platinum metal and ruthenium oxide. In these examples there are specifically disclosed coatings comprising platinum metal and rhodium oxide in a calculated proportion of 43.8:56.2 parts by weight, based on the proportions of the components of the coating composition, platinum metal and iridium oxide in a calculated proportion of 35.3:64.7 parts by weight, and platinum metal and ruthenium oxide in a calculated proportion of 42.6:57.4 parts by weight. There is no suggestion that a cathode coated with a platinum group metal in admixture with a platinum group metal oxide may have a hydrogen over voltage performance superior to that of a cathode coated with a platinum group metal alone or a platinum group metal oxide alone. Indeed, the exemplified coatings of platinum, and platinum in admixture with the various platinum group metal oxides, have essentially the same effect on the hydrogen over-voltage performance of the cathode with time.

The present invention is based on the observation that the hydrogen over-voltage of a cathode comprising a metallic substrate and a coating of a platinum group metal oxide may have a low value, and may be maintained at a low value for a prolonged period of time, when the cathode is used in the electrolysis of water or an aqueous solution, provided the platinum group metal oxide is used in admixture with a relatively small proportion of a platinum group metal. The proportion of platinum group metal which is necessary is substantially less than the proportions disclosed in the examples of the Japanese Patent Publication No. 5713189. Furthermore, the low hydrogen overvoltage of the cathode may be lower than, and is maintained for a longer period of time, than is the case where the coating on the cathode comprises platinum metal alone, or a platinum group metal oxide alone.

The present invention provides a cathode for use in an electrolytic cell which cathode comprises a metallic substrate and a coating thereon having at least an outer layer of a mixture of at least one platinum group metal and at least one platinum group metal oxide, in which the platinum group metal in the mixture thereof with the platinum group metal oxide comprises from 2% to 30% by weight of the mixture.

The cathode comprises a metallic substrate. The substrate may be of a ferrous metal, or of a film-forming metal, e.g. titanium. However, it is preferred that the substrate of the cathode is made of nickel or a nickel alloy or of another material having an outer face of nickel or nickel alloy. For example, the cathode may comprise a core of another metal, e.g. steel or copper, and an outer face of nickel or nickel alloy. A substrate comprising nickel or a nickel alloy is preferred on account of the corrosion resistance of such a substrate in an electrolytic cell in which aqueous alkali chloride solution is electrolysed, and on account of the long term low hydrogen over-voltage performance of cathodes of the invention which comprises a substrate of nickel or nickel alloy.

The substrate of the cathode may have any desired structure. For example, it may be in the form of a plate, which may be forminate, e.g. the cathode may be a perforated plate, or it may be in the form of an expanded metal, or it may be woven or unwoven. The cathode is not necessarily in plate form. Thus, it may be in the form of a plurality of so-called cathode fingers between which the anode of the electrolytic cell may be placed.

As it assists in the production of a cathode which operates with a low hydrogen over-voltage it is desirable that the surface of the nickel or nickel alloy substrate has a high surface area. Such a high surface area may be achieved by roughening the surface of the nickel or nickel alloy substrate, for example by chemically etching the surface or by grit-blasting the surface.

The coating on the metallic substrate comprises at least an outer layer of a mixture of at least one platinum group metal and at least one platinum group metal oxide. In general, the coating will consist of said mixture.

The platinum group metal in the coating on the cathode substrate may comprise one or more metals selected from platinum, palladium, iridium, rhodium, ruthenium and osmium. The platinum group metal oxide on the cathode substrate may comprise an oxide or oxides of one or more metals selected from platinum, palladium, iridium, rhodium, ruthenium and osmium. It is preferred that the platinum group metal in the coating is platinum metal itself, and that the platinum group metal oxide is an oxide of a platinum group metal other than platinum, as, for reasons which will be explained hereafter, a coating comprising a mixture of these components is relatively readily formed. The coating may comprise, for example, a mixture of platinum metal and ruthenium oxide.

It is preferred that the coating on the cathode comprises at least 5% by weight of platinum group metal in order that a substantial beneficial effect on the long term low hydrogen over-voltage performance of the platinum group metal oxide which is conferred by the presence of the platinum group metal in the coating may be obtained. In order to obtain this beneficial effect there is no advantage in the coating comprising more than 30% by weight of platinum group metal. Indeed, where the platinum group metal is platinum itself it would be economically disadvantageous for the coating to comprise more than 30% by weight of platinum metal. The coating preferably comprises no more than 25% by weight of platinum group metal. A preferred proportion of platinum group metal in the coating is in the range 5% to 20% by weight of the coating.

The coated cathode may be produced by applying to a metallic substrate a composition comprising precursors of the platinum group metal and precursors of the platinum group metal oxide, and treating the thus applied layer to form the mixture of platinum group metal and platinum group metal oxide. For example, precursors of the platinum group metal and of the platinum group metal oxide in solution in a solvent may be applied to the metallic substrate, the thus applied layer may be dried, and the dried coating may be fired, e.g. in an oxygen-containing atmosphere, at elevated temperature in order to convert the precursors into a mixture of platinum group metal and platinum group metal oxide. The steps of application of the composition, drying, and firing may be repeated until the desired coating loading is achieved. The firing conditions in particular will be chosen to produce the desired mixture of platinum group metal and platinum group metal oxide.

A suitable firing temperature is in the range 300° C. to 800° C.

The precursors in the composition may comprise inorganic salts of platinum group metals, for example platinum group metal halides, and/or organic salts or compounds of platinum group metals, for example, platinum group metal salts of organic acids, e.g. acetates, or platinum group metal resinates.

The solvent for the composition may comprise water and/or an organic solvent, for example an alcohol, e.g. ethanol, butanol or pentanol. The composition may comprise an inorganic acid, e.g. hydrochloric acid, or an organic acid, ag. acetic acid. Suitable precursors and solvents are well-known in the electrode coating art.

It may be advantageous to use the composition from which the coating is produced shortly after formation of the composition, as, depending on the components of the composition, it is believed that some decomposition of the components of the composition may take place if the composition is allowed to stand for a prolonged period of time before use.

Where the precursor is a precursor of platinum metal itself it is found that firing of such a precursor at a temperature in the above range, even, in the presence of an oxygen-containing atmosphere, e.g. air, results in the production of platinum metal itself, whereas firing of a precursor of a platinum group metal other than platinum metal itself in an oxygen-containing atmosphere at a temperature in the above range results in production of an oxide of a platinum group metal. Thus, for reasons of convenience of application it is preferred that the coating composition comprises a precursor of platinum metal and a precursor of at least one platinum group metal other than platinum metal itself. A preferred platinum metal precursor is chloro-platinic acid which is readily decomposed to platinum metal, and a preferred precursor of a platinum group metal oxide is ruthenium chloride which is readily decomposed to ruthenium oxide.

The cathode of the invention may form a part of a bipolar electrode.

The cathode is suitable for use in an electrolytic cell comprising an anode, or a plurality of anodes, a cathode, or a plurality of cathodes, and a separator positioned between each adjacent anode and cathode. The separator may be a porous electrolyte permeable diaphragm or it may be a hydraulically impermeable cation permselective membrane. The separator is preferably a membrane.

The anode in the electrolytic cell may be metallic, and the nature of the metal will depend on the nature of the electrolyte to be electrolysed in the electrolytic cell. A preferred metal is a film-forming metal, particularly where an aqueous solution of an alkali metal chloride is to be electrolysed in the cell.

The film-forming metal may be one of the metals titanium, zirconium, niobium, tantalum or tungsten or an alloy consisting principally of one or more of these metals and having anodic polarisation properties which are comparable with those of the pure metal. It is preferred to use titanium alone, or an alloy based on titanium and having polarisation properties comparable with those of titanium.

The anode may have a coating of an electro-conducting electro-catalytically active material. Particularly in the case where aqueous solution of an alkali metal chloride is to be electrolysed this coating may for example consist of one or more platinum group metals, that is platinum, rhodium, iridium, ruthenium, osmium and palladium, or alloys of the said metals, and/or an oxide or oxides thereof. The coating may consist of one or more of the platinum group metals and/or oxides thereof in admixture with one or more non-noble metal oxides, particularly a film-forming metal oxide. Especially suitable electro-catalytically active coatings include platinum itself and those based on ruthenium dioxide/titanium dioxide, ruthenium dioxide/tin dioxide, and ruthenium dioxide/tin dioxide/titanium dioxide.

Such coatings, and methods of application thereof, are well known in the art.

Cation permselective membranes are known in the art. The membrane is preferably a fluorine-containing polymeric material containing anionic groups. The polymeric material is preferably a fluoro-carbon containing the repeating groups $$[C_mF_{2m}]_M \text{ and } [CF_2-CF]_N$$
$$\phantom{[C_mF_{2m}]_M \text{ and } [CF_2-CF]_N} X$$

where m has a value of 2 to 10, and is preferably 2, the ratio of M to N is preferably such as to give an equivalent weight of the groups X in the range 500 to 2000, and X is chosen from $$A \text{ or } [OCF_2-CF]_pA$$
$$\phantom{A \text{ or } [OCF_2-CF]_pA} Z$$

where p has the value of for example 1 to 3, Z is fluorine or a perfluoroalkyl group having from 1 to 10 carbon atoms, and A is a group chosen from the groups:
—$SO_3H$
—$CF_2SO_3H$
—$CCl_2SO_3H$
—$X^1SO_3H$
—$PO_3H_2$
—$PO_2H_2$
—COOH and
—$X^1OH$
or derivatives of the said groups, where $X^1$ is an aryl group. Preferably A represents the group $SO_3H$ or —COOH. $SO_3H$ group-containing ion exchange membranes are sold under the tradename 'Nafion' by E I DuPont de Nemours and Co Inc and —COOH group-containing ion exchange membranes under the tradename 'Flemion' by the Asahi Glass Co Ltd.

The cathode of the invention is suitable for use in an electrolytic cell in which water or an aqueous solution is electrolysed and in which hydrogen is produced by electrolysis and evolved at the cathode. The cathode of the invention finds its greatest application in the electrolysis of aqueous solutions of alkali metal chlorides, particularly aqueous solutions of sodium chloride, and in water electrolysis, e.g. in the electrolysis of aqueous potassium hydroxide solution.

The invention is illustrated by the following examples.

EXAMPLE 1

A flat disc of nickel of 1 mm thickness (BS NA11, Vickers Hardness 100) was treated with trichloroethylene vapour to remove traces of oil and grease from the surface of the disc. The surface of the disc was then roughened by grit-blasting with 60–80 mesh fused alumina and the disc was then washed in 10% hydrochloric acid and finally in water. After drying the disc in a current of warm air the surface of the disc was sprayed with a coating of a paint composition comprising a solution of
43.24 g of ruthenium trichloride trihydrate,
5.0 g of chloroplatinic acid hydrate,
900 ml of n-pentanol and
100 ml of concentrated hydrochloric acid.

The thus coated disc was dried in air at 180° C. for 10 minutes and then heated in air at 450° C. for 20 minutes, after which it was allowed to cool to ambient temperature. The spraying, drying, heating and cooling procedure was repeated a further nine times to produce a nickel disc having a coating on the surface thereof comprising 7.8% by weight of platinum and 91.2% by weight of $RuO_2$.

The thus coated nickel disc was installed as a cathode in an electrolytic cell equipped with a titanium grid anode having a coating of 35% by weight $RuO_2$ and 65% by weight $TiO_2$, the anode and cathode being separated by a cation-exchange membrane comprising a perfluoropolymer having carboxylic acid ion-exchange groups and an ion-exchange capacity of 1.5 milli-equivalents per gram of dry membrane.

A saturated aqueous solution of sodium chloride was charged continuously to the anode compartment of the electrolytic cell, the cathode compartment was filled with 25% by weight aqueous sodium hydroxide solution, and electrolysis was commenced at a current density of 3 $kA/m^2$ of cathode surface. Water was charged continuously to the cathode compartment at a rate sufficient to maintain a concentration of 35% by weight of sodium hydroxide in the cathode compartment.

The initial hydrogen over-voltage was 54 m volts. After 90 days electrolysis the hydrogen over-voltage was 74 m volts.

By way of comparison the above procedure was repeated except that the paint composition comprised 9.61 g of ruthenium trichloride trihydrate,
180 ml of n-pentanol, and
20 ml of concentrated hydrochloric acid, and
a total of ten coats of the paint composition were applied to the nickel disc. The resultant coating consisted of $RuO_2$.

The initial hydrogen over-voltage was 183 m volts and after 8 days of electrolysis the hydrogen over-voltage was 183 m volts.

By way of further comparison the above procedure was repeated except that the paint composition comprised 3.13 g of chloroplatinic acid hydrate,
225 ml of n-pentanol, and
25 ml of concentrated hydrochloric acid, and a total of ten coats of the paint composition were applied to the nickel disc. The resultant coating consisted of platinum metal.

The initial hydrogen over-voltage was 393 m volts and after 12 days of electrolysis the hydrogen over-voltage was 372 m volts.

EXAMPLE 2

The procedure of Example 1 was repeated except that the paint composition comprised 46.1 g of ruthenium trichloride trihydrate,
2.5 g of chloroplatinic acid hydrate,
900 ml of n-pentanol, and
100 ml of concentrated hydrochloric acid, and the resultant coating on the surface of the nickel disc comprised 3.85% by weight of platinum and 96.15% by weight of $RuO_2$.

In the electrolysis of aqueous sodium chloride solution the initial hydrogen over-voltage was 89 m volts and after 35 days electrolysis the hydrogen over-voltage was 125 m volts.

By way of comparison the procedure of Example 1 was repeated except that the paint composition comprised 24.02 g of ruthenium trichloride trihydrate,
25.0 g of chloroplatinic acid hydrate,
900 ml of n-pentanol, and
100 ml of concentrated hydrochloric acid.

The resultant coating on the surface of the nickel disc comprised 43.2% by weight of platinum metal 56.8% by weight of $RuO_2$.

The initial hydrogen overvoltage was 71 m volts and after 42 days of electrolysis the hydrogen over voltage was 100 m volts.

By way of further comparison the procedure of Example 1 was repeated except that the paint composition comprised 12.0 g of ruthenium trichloride trihydrate,
37.5 g of chloroplatinic acid hydrate,
900 ml of n-pentanol, and
100 ml of concentrated hydrochloric acid.

The resultant coating on the surface of the nickel disc comprised 69.5% by weight of platinum metal 30.5% by weight of $RuO_2$.

The initial hydrogen over-voltage was 78 m volts and after 54 days of electrolysis the hydrogen over voltage was 104 m volts.

EXAMPLE 3

The procedure of Example 1 was repeated except that the paint composition which was used comprised 36.03 g of ruthenium trichloride trihydrate,
12.5 g of chloroplatinic acid hydrate,
900 ml of n-pentanol, and
100 ml of concentrated hydrochloric acid, and the resultant coating on the surface of the nickel disc comprised 20.2% by weight of Pt and 79.8% by weight of $RuO_2$.

In the electrolysis of aqueous sodium chloride solution the initial hydrogen over-voltage was 81 m volts and after 56 days electrolysis the hydrogen over-voltage was 132 m volts.

EXAMPLE 4

The procedure of Example 1 was repeated except that, after grit-blasting, the nickel disc was washed in water, and the paint composition which was used comprised 43.24 g of ruthenium chloride trihydrate,
5.0 g of chloroplatinic acid hydrate,
900 ml of glacial acetic acid, and
100 ml of concentrated hydrochloric acid.

The resultant coating on the surface of the nickel disc comprised 7.8% by weight of platinum metal and 92.2% by weight of $RuO_2$.

The initial hydrogen over-voltage was 71 m volts and after 307 days of electrolysis the hydrogen over-voltage was 100 m volts.

We claim:

1. A cathode for use in an electrolytic cell which comprises a metallic substrate and a coating thereon having at least an outer layer of a mixture of at least one platinum group metal and at least one platinum group metal oxide, characterised in that the platinum group metal in the mixture thereof with the platinum group metal oxide comprises from 2% to 30% by weight of the mixture.

2. A cathode as claimed in claim 1 wherein the substrate comprises a nickel or a nickel alloy.

3. A cathode as claimed in claim 1 or claim 2 wherein the coating comprises a mixture of platinum metal and an oxide of at least one platinum group metal other than platinum.

4. A cathode as claimed in claim 3 wherein the coating comprises a mixture of platinum metal and ruthenium oxide.

5. A cathode as claimed in claim 1 wherein the coating comprises at least 5% by weight of platinum group metal.

6. A cathode as claimed in claim 5 wherein the coating comprises from 5% to 25% by weight of platinum group metal.

7. A cathode as claimed in claim 1 wherein the coating on the metallic substrate is formed by applying to the surface of the substrate a layer of solution of the precursors of at least one platinum group metal and the precursors of at least one platinum group metal oxide, drying the layer, and firing the layer at elevated temperature in an oxygen-containing atmosphere.

* * * * *